Aug. 16, 1932.  T. J. ERDMAN  1,872,066
HITCH CONNECTION FOR PLOWS WITH SEEDERS
Original Filed May 1, 1930    2 Sheets-Sheet 1
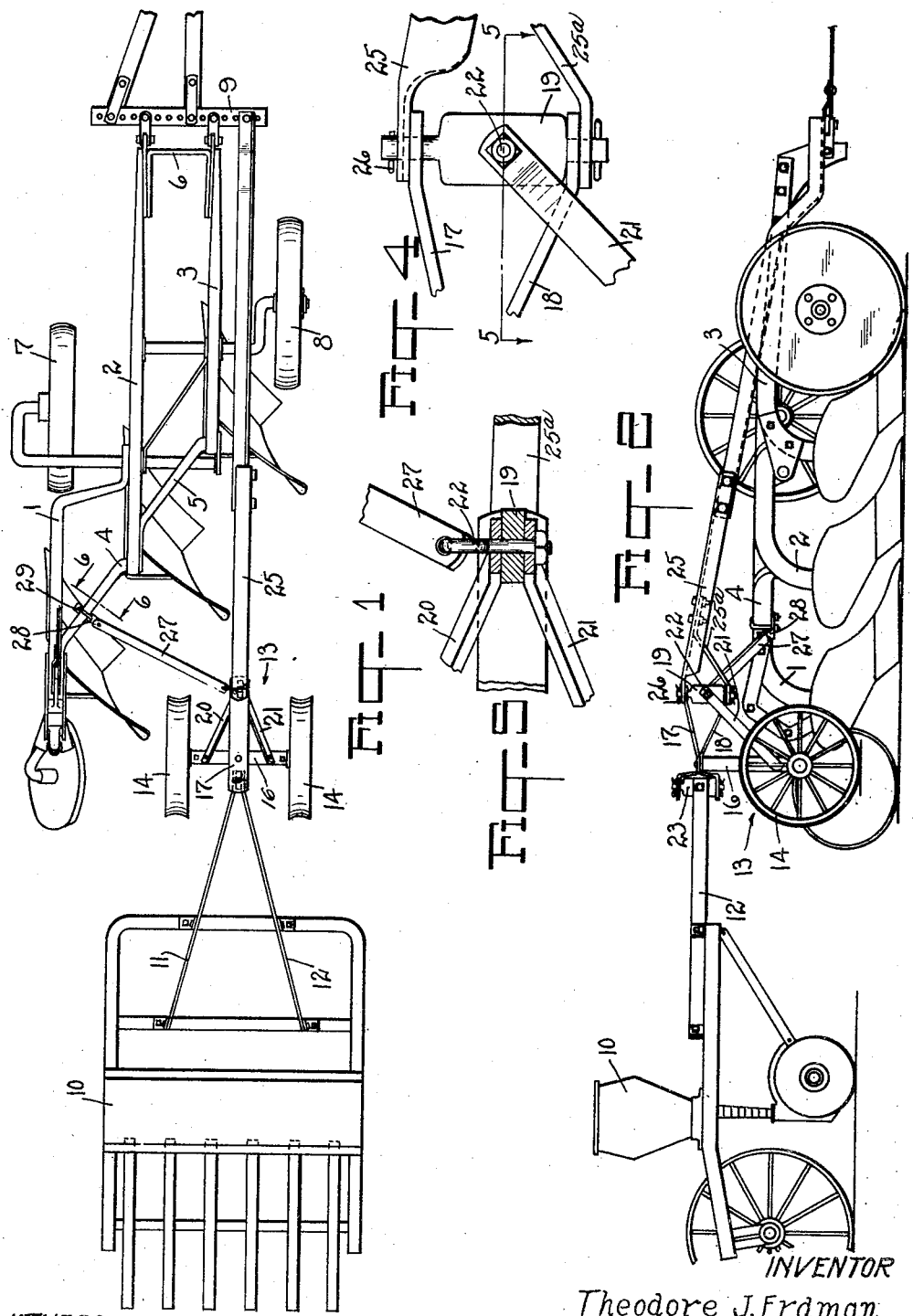
WITNESS
A. D. McLeay.
INVENTOR
Theodore J. Erdman
BY
ATTY.

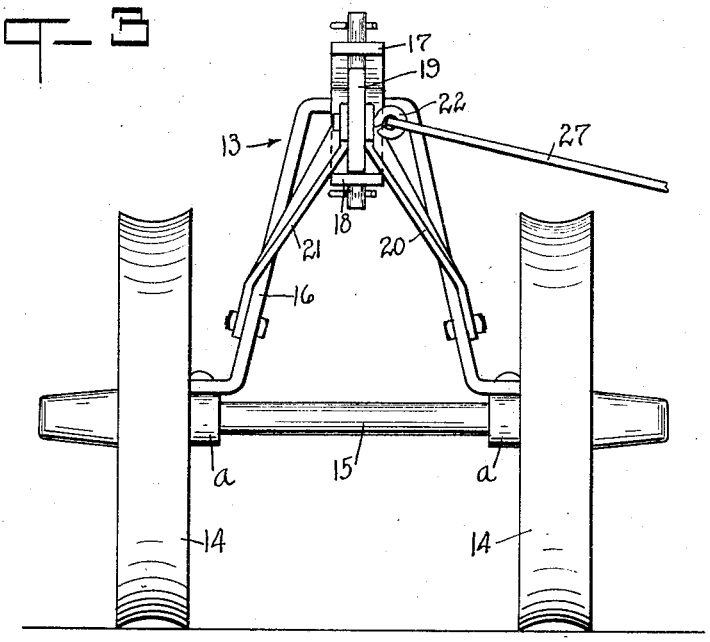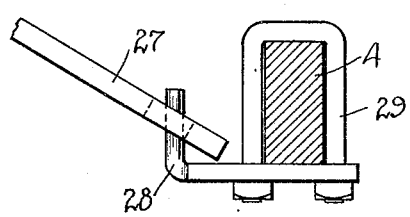

Patented Aug. 16, 1932

1,872,066

UNITED STATES PATENT OFFICE

THEODORE J. ERDMAN, OF HORICON, WISCONSIN, ASSIGNOR TO THE VAN BRUNT MANUFACTURING COMPANY, OF HORICON, WISCONSIN, A CORPORATION OF WISCONSIN

HITCH CONNECTION FOR PLOWS WITH SEEDERS

Application filed May 1, 1930, Serial No. 448,932. Renewed November 12, 1931.

My invention relates to devices for connecting agricultural machines, and implements, one with the other in trailing order, and the object of my invention is to provide a wheeled element at the connecting point to which various types of machines are adapted to be attached.

It is a further object of my invention to provide a combination of machines in trailing relation, such as a plow and a seeder or planter, to operate directly on the freshly turned soil, or other machines which may be utilized to further prepare the plowed ground for seeding, and to interpose between the plow and the trailing machine a wheeled element to which the plow and machine will be pivotally attached in such a manner as to better control of the trailer in following the plow particularly when the latter is turning. Other objects will be disclosed in the following specification.

Referring to the drawings in which similar numerals indicate identical parts—

Figure 1 is a plan view of a gang plow with a following machine attached thereto, and embodying my invention;

Figure 2 is a side elevation of Figure 1;

Figure 3 is an enlarged front elevation of the wheeled element forming part of my invention;

Figure 4 is an enlarged detail;

Figure 5 is a section on the line 5—5 of Figure 4; and,

Figure 6 is a detail section on the line 6—6 of Figure 1.

The gang plow shown is of a well known type. The frame thereof is composed of the beams 1, 2 and 3 spaced apart equidistant by suitable braces 4, 5 and 6, and supported on wheels 7 and 8. To the beams 2 and 3 is attached a draw bar 9 adapted to be connected to a tractor. A diagrammatic representation of a seeding machine 10 is provided with draft bars 11 and 12 secured to the seeder and converging forwardly to a wheeled element 13 to which they are connected by a horizontal and a vertical pivot as will be further explained.

The wheeled element 13 comprises wheels 14 journaled on an axle 15, and secured to sleeves $a$ on the axle adjacent the wheels is a vertically disposed arch 16, and mounted on the apex of the arch is a member formed of bars 17 and 18 diverging forwardly to receive between the ends thereof a block 19 having reduced ends to fit in alined holes in the bars. Braces 20 and 21 are secured to the arch adjacent the sleeves $a$ and extend upwardly to the block 19 to which they are secured by an eyebolt 22. The rear ends of the bars 17 and 18 are spaced apart and provided with alined holes in which are rotatably journaled the reduced ends of a block 23, similar to the block 19, and to the center of the block 23 is pivotally attached, by a bolt 24, the forward ends of the draft bars 11 and 12 of the machine 10.

Extending forwardly from the wheeled element 13 is a tongue 25 its rear end connected to the upper end of the block 19 and held thereon by a pin or cotter 26. A brace 25a is provided at the rear end of tongue 25 which extends downwardly and is connected to the lower end of block 19 and held thereon by a pin or cotter 26a. The tongue 25 extends forwardly and is bolted to the draw bar 9. A brace 27 is connected to the eye of the bolt 22 and extends to the brace 14 to which it is attached by a hook member 28 secured on the brace 14 by a U-bolt 29, the brace 27 operating to hold the tongue 25 in parallelism with the plow, but permitting a degree of vertical flexibility because of the loose attachment of the brace 27 to the eye of the bolt 22 and to the hook member 28, this flexible condition permitting the wheeled element and attached machine to operate to better advantage over rough ground.

It will be noted that the pivotal connection of the tongue with the wheeled element is located a greater distance forwardly of the axle than the pivotal connection of the trailing machine is rearwardly thereof, for I have found by this construction that when the plow is making a turn the liability of the wheeled element to tilt is practically eliminated, and the trailing machine follows the element with but slight deviation from the line of travel in turning.

What I claim is—

1. The combination with a plow having a draw bar, of a tongue attached to the draw bar and extending rearwardly therefrom, a wheeled element connected to the rear of the tongue by a vertical pivot, and a trailing machine attached to the rear of said element by vertical and horizontal pivots.

2. The combination with a plow having a draw bar, of a tongue attached to the draw bar and extending rearwardly therefrom in parallelism with the plow frame, a wheeled element connected to the rear of the tongue by a vertical pivot, and a trailing machine attached to the rear of said element by vertical and horizontal pivots.

3. The combination with a plow having a draw bar, of a tongue attached to the draw bar and extending rearwardly therefrom in parallelism with the plow frame, a wheeled element connected to the rear of the tongue by a vertical pivot, a brace loosely attached to said pivotal connection and extending to similar attachment with the plow, and a trailing machine attached to the rear of said element by vertical and horizontal pivots.

4. The combination with a plow having a draw bar, of a tongue attached to the draw bar and extending rearwardly therefrom, a wheeled element connected to the rear of the tongue by a vertical pivot, a trailing machine attached to the rear of said element by vertical and horizontal pivots, the connection of the tongue and said element being located forwardly of the axis thereof a greater distance than the connection of the trailing machine from the rear of said axis.

5. The combination with a plow, of a tongue attached to the plow adjacent the forward end thereof and extending rearwardly therefrom, a wheeled element connected to the rear of the tongue by a vertical pivot, and a trailing machine attached to the rear of said element by vertical and horizontal pivots.

6. The combination with a plow, of a tongue connected to the plow adjacent the forward end thereof, a wheeled element, connecting means connecting said wheeled element to the rear end of said tongue, a trailing machine, and other connecting means connecting said trailing machine with said wheeled element, one of said connecting means including a vertical pivot and the other of said connecting means including a vertical pivot and a horizontal pivot.

7. The combination with a plow, of a tongue connected to the plow, a wheeled element connected to the rear of the tongue by a vertical pivot, a brace loosely attached to said pivotal connection and to the plow to hold the rear end of said tongue spaced from the plow, meanwhile permitting vertical movement of the rear end of the tongue with respect to the plow, and a trailing machine attached to the rear of said element by a vertical pivot and a horizontal pivot.

8. The combination with a plow, of an implement, means for drawing said implement from said plow in trailing position with respect to the plow, said drawing means comprising a wheeled element to which the implement is pivotally connected, and a forwardly extending tongue connected to the plow at its forward end and to said wheeled element at its rear end at a point spaced forwardly of the point of connection of the implement with the wheeled element, and a brace loosely connected between the drawing means and the plow to hold the rear end of the tongue spaced from the plow, meanwhile permitting the wheeled element to rise and fall with respect to the plow in traveling over uneven ground.

9. The combination with a plow, of an implement, means for drawing said implement from said plow in trailing position with respect to the plow, said drawing means comprising a wheeled element to which the implement is connected, and a forwardly extending tongue pivotally connected to the plow at its forward end and to said wheeled element at its rear end, and a spacing member positioned between the drawing means and the plow to hold the rear end of the tongue spaced from the plow, meanwhile permitting the wheeled element to rise and fall with respect to the plow in traveling over uneven ground.

10. The combination with a plow, of an implement, means for drawing said implement from said plow in trailing position with respect to the plow, said drawing means comprising a wheeled element to which the implement is pivotally connected by means of a vertical and a horizontal pivot, and a forwardly extending tongue connected to the plow at its forward end and to said wheeled element at its rear end, and a spacing member positioned between the drawing means and the plow to hold the rear end of the tongue spaced from the plow, meanwhile permitting the wheeled element to rise and fall with respect to the plow in traveling over uneven ground.

THEODORE J. ERDMAN.